Oct. 20, 1925.　　　　　　　　　　　　　　1,558,250
P. DHÉ
MELTING FURNACE OF THE TILTING TYPE
Filed March 1, 1924　　　4 Sheets-Sheet 2

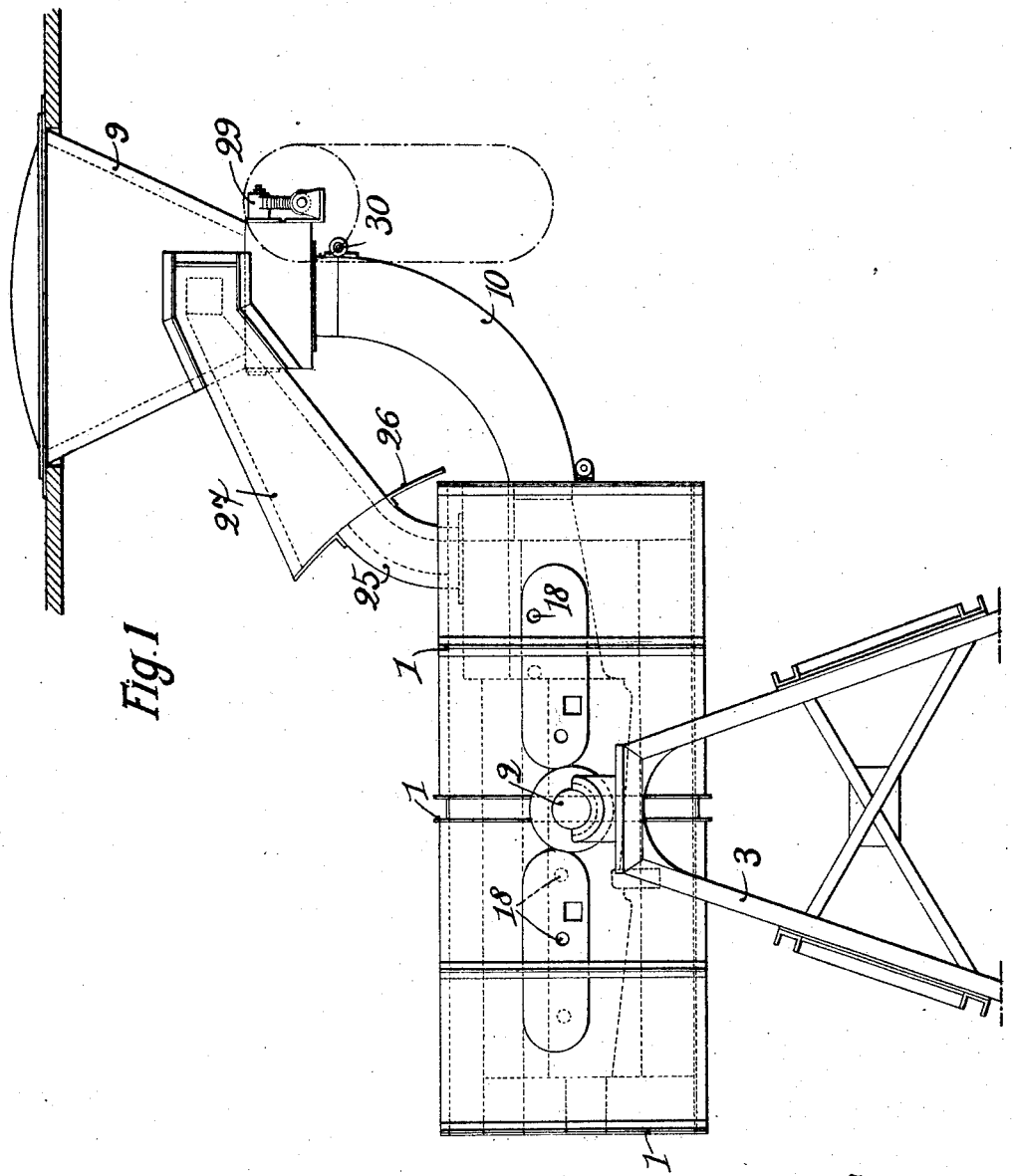

Inventor
PAUL DHÉ
By H. B. Willson & Co.
Attorneys

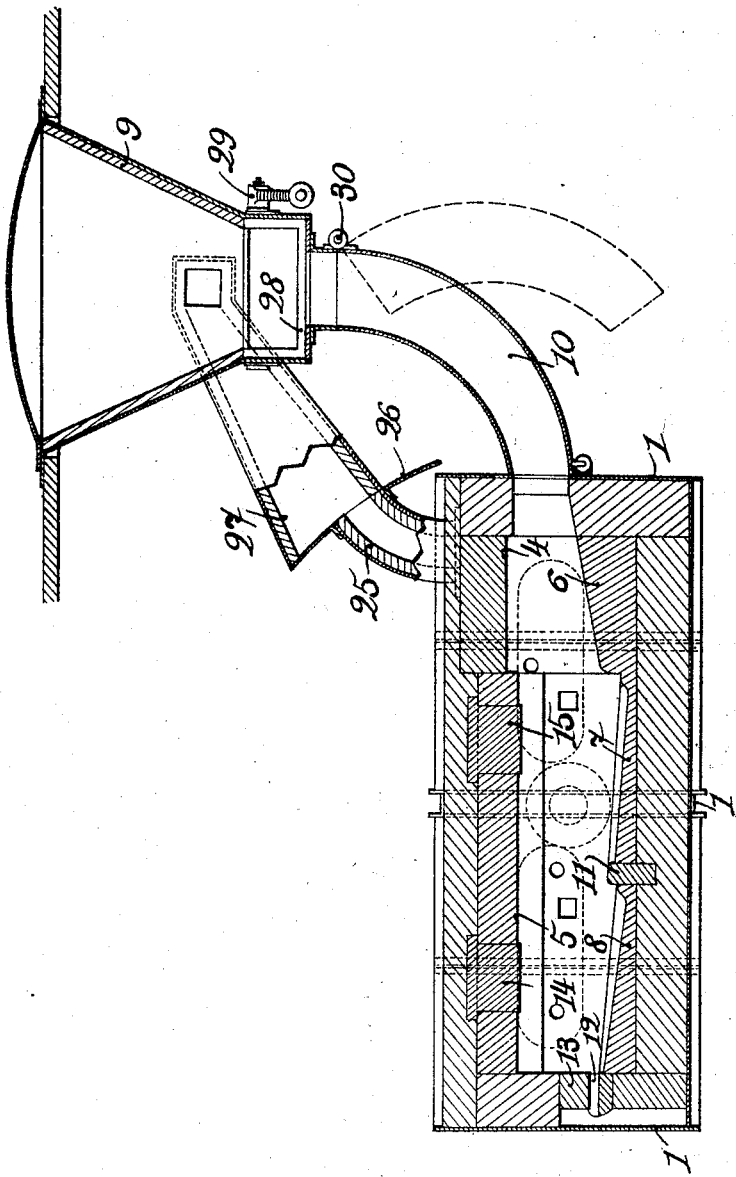

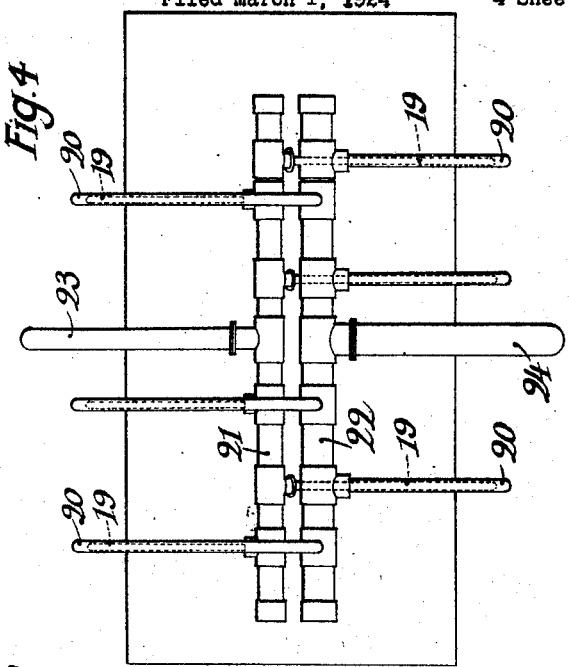
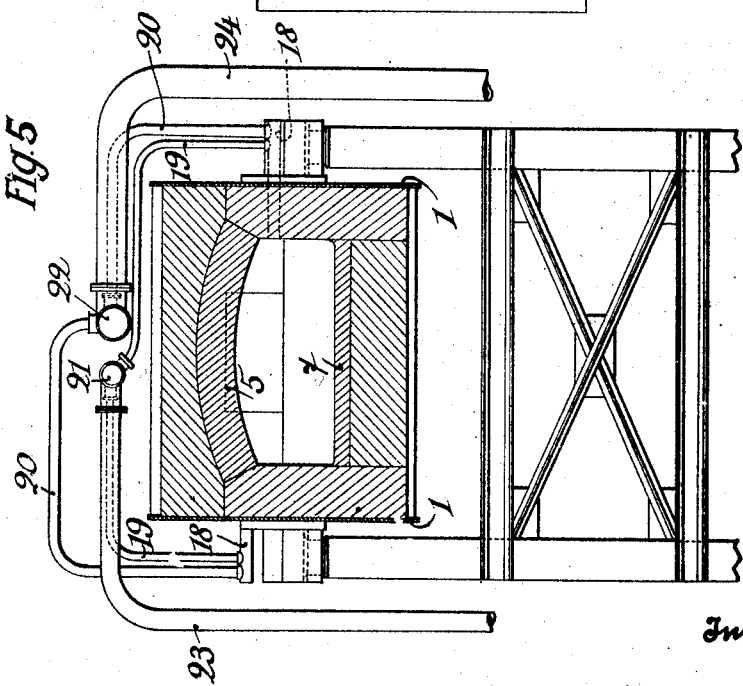

Patented Oct. 20, 1925.

1,558,250

UNITED STATES PATENT OFFICE.

PAUL DHÉ, OF PARIS, FRANCE.

MELTING FURNACE OF THE TILTING TYPE.

Application filed March 1, 1924. Serial No. 696,296.

*To all whom it may concern:*

Be it known that I, PAUL DHÉ, a citizen of the Republic of France, and residing at Paris, Seine Department, No. 33 Avenue des Champs Elysees, in the Republic of France, have invented certain new and useful Improvements in Melting Furnaces of the Tilting Type, of which the following is a specification.

The present invention has for its object a tilting furnace which serves chiefly for the melting of basalt and provides for the direct casting of the substance in moulds, without requiring the use of portable ladles.

The said furnace comprises a parallelopipedon body made of fire-brick and mounted in a metallic frame which is enabled to rotate on a horizontal axis situated near the centre of gravity, so that a very small effort will be required to carry out the tipping movements of the furnace.

The appended drawings show by way of example an embodiment of the invention.

Fig. 1 is an elevational view and

Fig. 2 a plan view.

Fig. 3 is a lengthwise section on the centre line.

Fig. 4 is a plan view of the conduits.

Fig. 5 is a cross-section of the furnace.

The said furnace comprises a main body composed of refractory material which is maintained by metallic framing parts 1 and is mounted upon a pair of trunnions 2, the latter being supported for instance by a structural metallic upright 3. The roof of the furnace comprises two steps 4 and 5, and the hearth is divided into three portions 6, 7 and 8. The portion 6 is forwardly inclined and receives the basalt which is supplied by a loading hopper 9 through the conduit 10. The basalt when brought to the temperature of fusion will flow into the portion 7 constituting the melting basin. The bottom of said basin is rearwardly inclined in order to diminish the inoperative angle in which the basalt might accumulate when the furnace is tilted for running off the melted substance through the tap hole.

The front part 8 is separated from the basin 7 by a sill 11 which is levelled off at a point situated at about 2 cm. below the level of the gate 12, in the horizontal position of the furnace. The said front part constitutes the refining basin, and in the intervals between the casting operations the melted basalt remains in the said basin in a thin layer and becomes freed from air bubbles. The bottom of said refining basin is considerably inclined from front to rear in order to eliminate any inoperative angle when the casting takes place.

Access is had to the interior of the said furnace:

(1) At the front part by an aperture situated above the tap hole and closed by a refractory block 13, or by a door which is lined with refractory material;

(2) At the top by two sight holes 14, 15 situated above the refining basins;

(3) At the rear, by two doors 16, 17 lined with refractory material and fitting into each other.

The said furnace is heated by means of gas or oil burners 18 of the blowpipe type, disposed upon the lateral faces of the furnace and in staggered arrangement whereby the flames from the burners on one side will not come into direct contact with the burners on the other side. The gas or oil pipes 19 and the air pipes 20 of each burner are connected respectively with the main pipes 21, 22 which are mounted at the top of the furnace. The latter pipes are connected either by pivot joints to gas and air inlet pipes, not shown, which are fitted upon the trunnions of the furnace, or by flexible pipes 23, 24, Fig. 5, with conduits of any desired type for the supply of gas and air. Each of the main conduits comprises a regulating valve and a pressure gauge.

The gases of combustion escape partly through the tap hole whose temperature they maintain at the proper degree to ensure the fluidity of the basalt, and partly through two outlet conduits 25 made of heavy sheet steel and provided with a refractory coating, these being situated at the upper rear part and on each side of the centre line of the furnace.

The upper ends of said outlet conduits have the shape of a circular arc whose centre is the centre of the trunnions of the furnace. The said conduits are protected at the top by a shield of heavy sheet steel 26, and open into the conduits 27 which are provided with a refractory coating and serve to deliver the gas to each side of the basalt loading hopper; the gas enters the latter through a grating, not shown, and traverses the basalt to which it imparts its heat before escaping into the atmosphere. The loading hopper, which is closed by a door 28 hinged at 29, communicates at the bottom with a chute 10 of rectangular cross-section, which is hinged at 30 and may be brought into contact with the rear door of the furnace adjacent the aperture which is closed by the covers 16, 17.

To load the furnace, it suffices to open the door 28; the basalt will then fall by its own weight into the conduit 10, and due to the shape of the latter it will be projected by kinetic energy upon the inclined part of the hearth of the furnace. A suitable flap, not shown, can be provided on the rear face of the said chute whereby the material which has not fallen by gravity may be impelled into the furnace.

For the casting operation, the moulds disposed upon special conveyors or on wheeled transporters are brought below the tap hole. The furnace is then tilted by hand, for instance by a control lever, not shown; this operation can be readily performed, as the furnace is pivoted at its centre of gravity. Due to the tipping movement, the basalt in the said refining basin will flow directly into the mould, and when the latter is filled the furnace can be raised into position.

Obviously, the constructional form herein represented by way of example is susceptible of various modifications without departing from the spirit of the invention. The said furnace may also serve for the fusion of other substances than basalt, and various fuels such as fuel oil and like oils, or other suitable combustibles, may be substituted for gas.

It should be observed that in the constructional form hereinbefore described, the chimney and the hopper are independent of the furnace and do not pivot with the latter, so that it is an easy matter to perform the tipping operation, and the latter is furthered by the fact that pivoting axis of the furnace is situated practically at the same level as the centre of gravity.

The above-mentioned type of hopper is chiefly used in the case in which the basalt has been preliminarily broken into pieces large enough to allow the gas to flow between the same. Should basalt in powder or in very fine grains be treated, it may be advisable to use a hopper comprising a set of heating tubes, the gas flowing either within or without the said tubes.

Claims:

1. In a tilting furnace for the fusion of basalt providing for the direct casting of the melted substance in molds, the combination of a furnace properly so called which is built of fire brick and is provided with a tap hole at the front and a loading aperture at the rear, a metal frame supporting the said furnace, a horizontal axle having the said frame pivoted thereon, and a hearth situated within the said furnace, said hearth being divided into three parts whereof one is forwardly inclined and serves to contain the substances to be melted and the other two constitute the melting basin and are rearwardly inclined.

2. In a tilting furnace for the fusion of basalt providing for the direct casting of the melted substance in molds, the combination of a furnace properly so called which is built of fire brick and is provided with a tap hole at the front and a loading aperture at the rear, a metal frame supporting the said furnace, a horizontal axle having the said frame pivoted thereon, and a hearth situated within the said furnace, said hearth being divided into three parts whereof one is forwardly inclined and serves to contain the substances to be melted and the other two constitute the melting basin and are rearwardly inclined, and a sill interposed between the two rearwardly-inclined hearths, the said sill being situated below the level of the tap hole.

3. In a tilting furnace for the fusion of basalt providing for the direct casting of the melted substance in molds, the combination of a furnace properly so called which is built of fire brick and is provided with a tap hole at the front and a loading aperture at the rear, a metal frame supporting the said furnace, a horizontal axle having the said frame pivoted thereon, and a hearth situated within the said furnace, said hearth being divided into three parts whereof one is forwardly inclined and serves to contain the substances to be melted and the other two constitute the melting basin and are rearwardly inclined, gas burners disposed within the lateral walls of the furnace and in staggered disposition whereby the flames issuing from the burners on one side shall be prevented from coming into direct contact with the burners on the other side.

4. In a tilting furnace for the fusion of basalt providing for the direct casting of the melted substance in molds, the combination of a furnace properly so called which is built of fire brick and is provided with a tap hole at the front and a loading aperture at the rear, a metal frame supporting the said furnace, a horizontal axle having the said frame pivoted thereon, and a hearth situated within the said furnace, said hearth being divided into three parts whereof one is forwardly inclined and serves to contain the substances to be melted and the other two constitute the melting basin and are rearwardly inclined, outlet conduits for the gases of combustion disposed above the said forwardly-inclined hearth, the outer ends of said conduits having the shape of an arc of a circle which has for its centre the pivoting axis of the furnace.

5. In a tilting furnace for the fusion of basalt providing for the direct casting of the melted substance in molds, the combination of a furnace properly so called which is built of fire brick and is provided with a tap hole at the front and a loading aperture at the rear, a metal frame supporting the said furnace, a horizontal axle having the said frame pivoted thereon, and a hearth situated within the said furnace, said hearth being divided into three parts whereof one is forwardly inclined and serves to contain the substances to be melted and the other two constitute the melting basin and are rearwardly inclined, outlet conduits for the gases of combustion disposed above the said forwardly-inclined hearth, the outer ends of said conduits having the shape of an arc of a circle which has for its centre the pivoting axis of the furnace, a shield made of heavy steel plate disposed upon the outer ends of said gas conduits, the said shield being curved according to the arc of a circle having as its centre the pivoting axis of the furnace.

6. In a tilting furnace for the fusion of basalt providing for the direct casting of the melted substance in molds, the combination of a furnace properly so called which is built of fire brick and is provided with a tap hole at the front and a loading aperture at the rear, a metal frame supporting the said furnace, a horizontal axle having the said frame pivoted thereon, and a hearth situated within the said furnace, said hearth being divided into three parts whereof one is forwardly inclined and serves to contain the substances to be melted and the other two constitute the melting basin and are rearwardly inclined, outlet conduits for the gases of combustion disposed above the said forwardly-inclined hearth, the outer ends of said conduits having the shape of an arc of a circle which has for its centre the pivoting axis of the furnace, a basalt feeding hopper disposed above the rear part of the furnace, conduits whereof one end opens into said hopper and the other is open to the atmosphere, the latter end being adjacent the outer end of the said outlet conduits.

7. In a tilting furnace for the fusion of basalt providing for the direct casting of the melted substance in molds, the combination of a furnace properly so called which is built of fire brick and is provided with a tap hole at the front and a loading aperture at the rear, a metal frame supporting the said furnace, a horizontal axle having the said frame pivoted thereon, and a hearth situated within the said furnace, said hearth being divided into three parts whereof one is forwardly inclined and serves to contain the substances to be melted and the other two constitute the melting basin and are rearwardly inclined, outlet conduits for the gases of combustion disposed above the said forwardly-inclined hearth, the outer ends of said conduits having the shape of an arc of a circle which has for its centre the pivoting axis of the furnace, a basalt feeding hopper disposed above the rear part of the furnace, conduits whereof one end opens into said hopper and the other is open to the atmosphere, the latter end being adjacent the outer end of the said outlet conduits, a chute serving to connect the said hopper with the loading aperture of the furnace, and a hinge for pivoting the said chute.

8. In a tilting furnace for the fusion of basalt providing for the direct casting of the melted substance in molds, the combination of a furnace properly so called which is built of fire brick and is provided with a tap hole at the front and a loading aperture at the rear, a metal frame supporting the said furnace, a horizontal axle having the said frame pivoted thereon, and a hearth situated within the said furnace, said hearth being divided into three parts whereof one is forwardly inclined and serves to contain the substances to be melted and the other two constitute the melting basin and are rearwardly inclined, outlets conduits for the gases of combustion disposed above the said forwardly-inclined hearth, the outer ends of said conduits having the shape of an arc of a circle which has for its centre the pivoting axis of the furnace, a basalt feeding hopper disposed above the rear part of the furnace, conduits whereof one end opens into said hopper and the other is open to the atmosphere, the latter end being adjacent the outer end of the said outlet conduits, a movable flap disposed within the said hopper for closing the lower end of the same.

In testimony that I claim the foregoing as my invention, I have signed my name.

PAUL DHÉ.